UNITED STATES PATENT OFFICE.

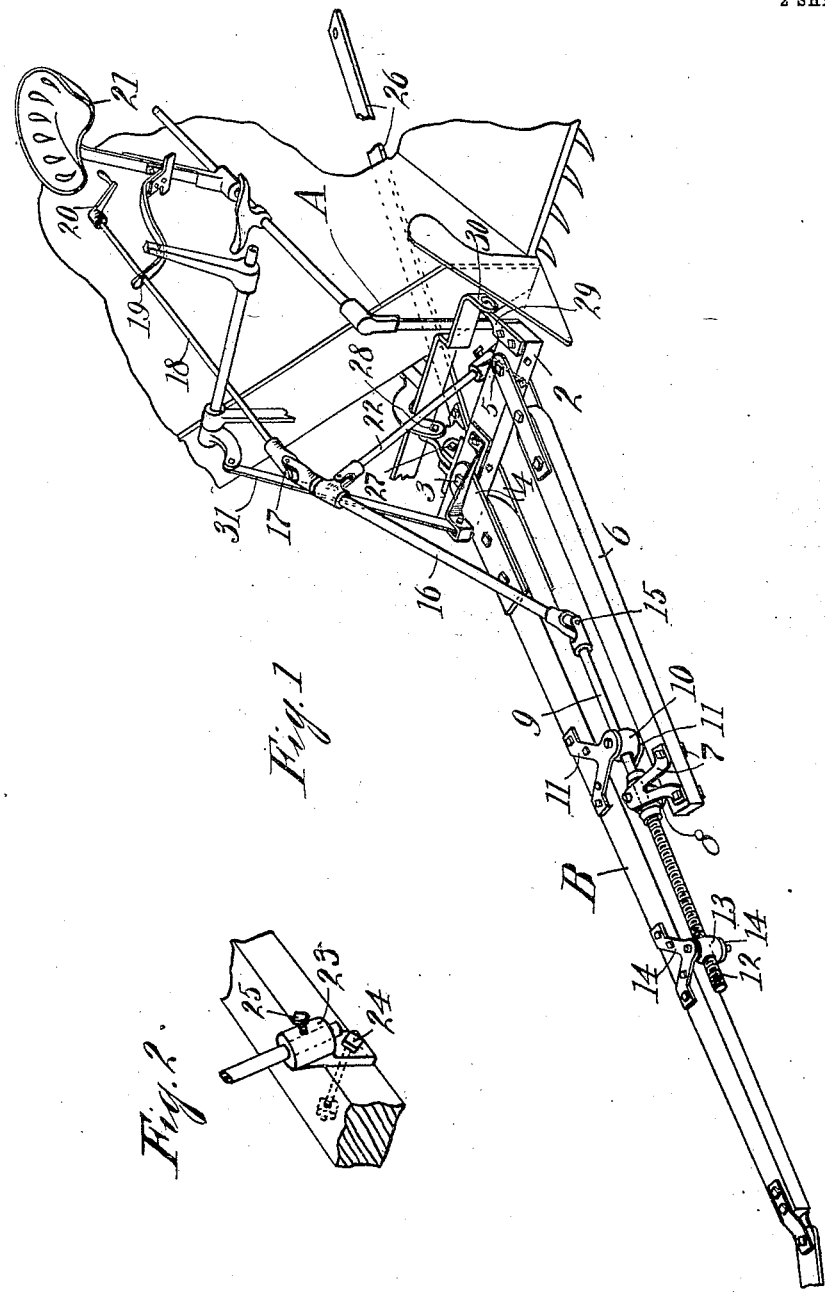

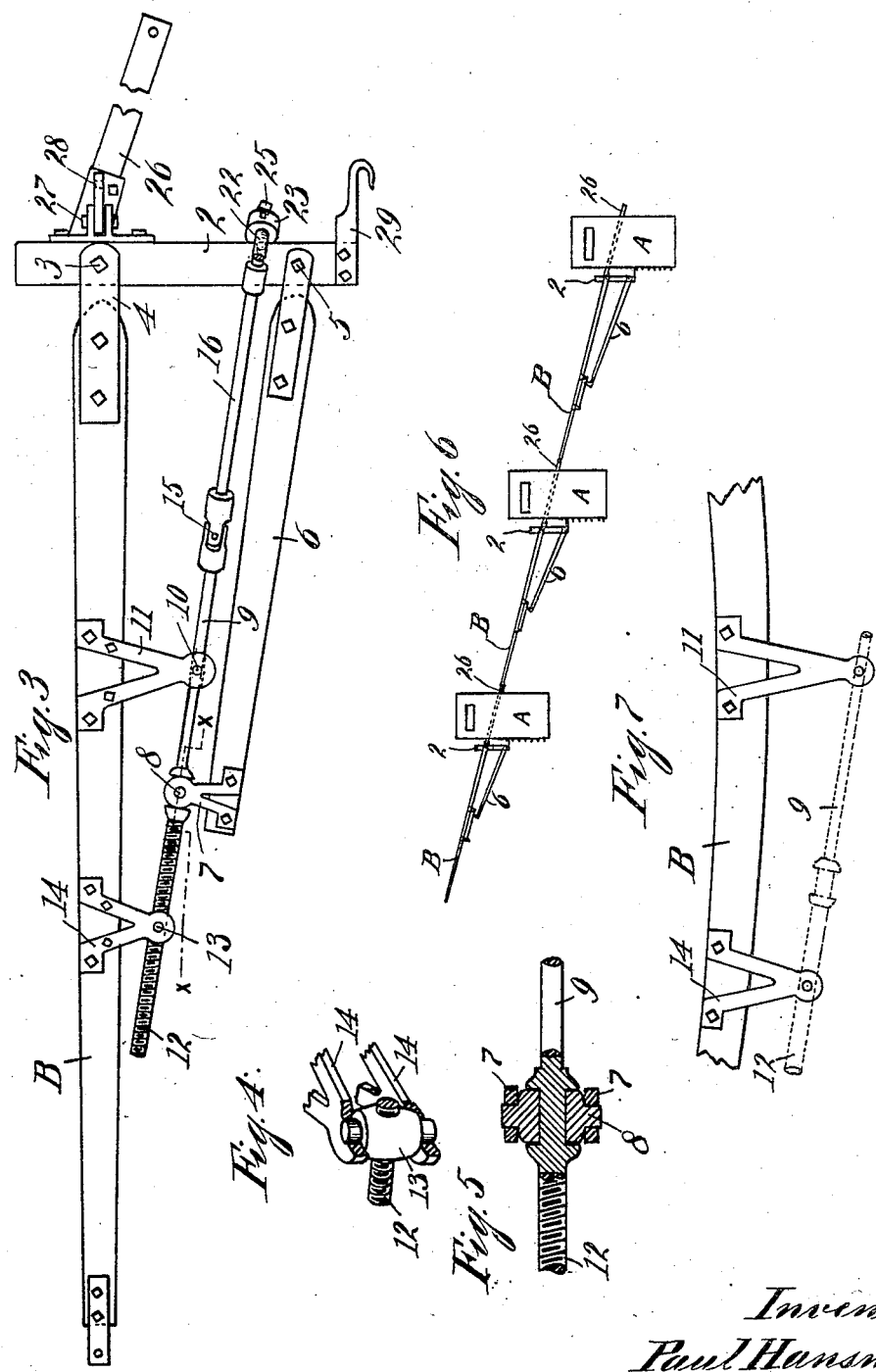

PAUL HANSMANN, OF LONG PRAIRIE, MINNESOTA, ASSIGNOR TO HANSMANN MANUFACTURING COMPANY, OF LONG PRAIRIE, MINNESOTA, A CORPORATION OF MINNESOTA.

COUPLING MEANS FOR VEHICLES.

1,049,082.   Specification of Letters Patent.   Patented Dec. 31, 1912.

Continuation of application Serial No. 544,054, filed February 15, 1910. This application filed January 13, 1911. Serial No. 602,507.

*To all whom it may concern:*

Be it known that I, PAUL HANSMANN, a citizen of the United States, residing at Long Prairie, in the county of Todd and State of Minnesota, have invented certain new and useful Improvements in Coupling Means for Vehicles, of which the following is a specification.

My invention relates to improvements in coupling means for connecting two or more vehicles arranged one behind the other, its object being particularly to provide improved means for controlling the travel of each vehicle to allow it to travel in an offset path as in connecting a plurality of binders and causing each binder to cut a separate swath.

To this end my invention consists in the features of construction, combination and arrangement of parts hereinafter described and claimed.

In the accompanying drawings forming part of this specification, Figure 1 is a perspective view of a portion of the front end of a binder and connected draft pole fitted with my improvements; Fig. 2 is a perspective view of a portion of a support for the pole adjusting mechanism; Fig. 3 is a plan view of a pole and connecting parts; Fig. 4 is a detail broken away of a portion of the controlling mechanism; Fig. 5 is a section on line $x$—$x$ of Fig. 3; Fig. 6 is a plan view of a plurality of binders with my improved features arranged in connection therewith;
and Fig. 7 is a plan view of a draft pole broken away illustrating the action of the pivotal supports for the adjusting screw where the apparatus is subjected to a particularly heavy strain.

In the drawings A represents the framework of the vehicle to be drawn and B the draft pole. The pole B has pivotal support on a cross bar 2 by means of a vertical pivot 3 passing through the cross bar and through straps 4 extending rearwardly from the top and bottom faces of the pole. Having pivotal support 5 upon the cross bar alongside of and interspaced from the pole is a forwardly extending bar 6. Pivotally supported in brackets 7 on the inner side of the free end of the bar 6 is a nut 8 in which a rod or shaft 9 has journal support. The inner end of the rod 9 extends slidably through a nut 10 pivoted in the outer ends of the brackets 11 carried by the pole. The opposite end 12 of the rod is threaded through a nut 13 pivotally supported in the outer ends of brackets 14 extending from the adjacent side of the pole. The inner end of the rod has pivotal connection 15 with a rod 16 which in turn has pivotal connection 17 with a rod 18 having support 19 upon the binder frame. The rod 18 carries a handle 20 adjacent to the driver's seat 21. The rear end of the rod 16 has slidable support from the cross bar 2 through the medium of a rod 22 pivotally connected with the rod 16 at its upper end and slidable at its lower end in a collar 23, the collar 23 having pivotal support 24 upon the rear side of the cross bar. The rod 22 is held in adjusted positions in the collar by a suitable screw 25. The cross bar is connected with the binder frame through the medium of a draw-bar 26 which draw-bar has horizontal pivotal connection 27 with the cross bar and 28 with the binder frame. One end of the cross bar is further connected with the binder frame by a hook 29 in the cross bar and extending through the eye 30 in the binder frame. The binder frame is adapted to be tilted through the medium of lever mechanism 31. The means for attaching the cross bar to the binder frame and for tilting the binder frame are not claimed as a part of the present invention, being embodied in another application.

In operation, where it is desired to set the pole so that the binder will travel to one side of the machine in front it is only necessary for the driver to turn the handle 20 to screw the rod 9 forwardly or rearwardly through the nut 13 to set the pole at the desired angle with the cross bar. The pole may thus be turned in either direction to cause the machine to travel to either side of the machine in front.

In Fig. 7 is illustrated the pole slightly sprung as where the binders come in contact with some obstruction or strike an unusually heavy growth of grain. Any such extraordinary springing of the pole is prevented from binding the adjusting mechanism by reason of the rod being threaded through a pivoted nut 13, and being journaled in a similarly pivoted nut 8 and slidable through the nut 10.

One of the important features of the invention is the pivotal support for the collar 23 which allows the rod or arms 16 and 18 to be horizontally swung as well as vertically adjusted to accommodate them to different constructions of binder frames.

This application takes the place of abandoned application Serial Number 544,054.

I claim as my invention:

1. In combination with a cross bar, a draft pole having pivotal support thereon, a relatively short bar with a pivotal support alongside said pole, a shaft pivotally supported by the free end of said short bar and having traveling connection with said pole, and hand operative mechanism for said shaft.

2. In combination with a vehicle and its steering frame, a draft pole having pivotal support upon said frame, a relatively short bar having pivotal support alongside said pole, an adjusting connection between the free end of said bar and said pole, said adjusting connection having pivotal support upon said bar and traveling support in connection with said pole, and hand operative mechanism for said adjusting connection.

3. In combination with a vehicle and its steering frame, a draft pole pivotally supported by said frame, means for swinging said pole upon its pivot comprising a pivotally supported bar extending forwardly and alongside said draft pole and a traveling connection between said bar and pole, said traveling connection and having pivotal support on the end of said bar and having screw-threaded support upon said pole at one side of said pivotal support and a sliding connection upon said pole at the opposite side of said pivotal support, and hand operative mechanism for said traveling connection.

4. In combination with a vehicle and its steering frame, a draft pole pivotally supported by said frame, means for swinging said pole upon its pivot comprising a pivotally supported bar extending forwardly and alongside said draft pole and a traveling connection between said bar and pole, said traveling connection having pivotal support upon said bar and having screw threaded support upon said pole at one side of said pivotal support and a sliding connection upon said pole at the opposite side of said pivotal support, hand operative mechanism for said traveling connection comprising pivotally connected rods connecting said traveling connection with a handle, and an adjusting support for said arms.

5. In combination with a vehicle and its steering frame, a draft pole pivotally supported by said frame, means for swinging said pole upon its pivot comprising a pivotally supported bar extending forwardly and alongside said draft pole and a traveling connection between said bar and pole, said traveling connection having pivotal support on the end of said bar and having screw threaded support upon said pole at one side of said pivotal support and a sliding connection upon said pole at the opposite side of said pivotal support, hand operative mechanism for said traveling connection comprising pivotally connected rods connecting said traveling connection with a handle, and a pivoted adjustable support for said arms.

6. In combination with a vehicle and its steering frame, a draft pole having pivotal support thereon, a relatively short bar having pivotal support alongside said pole, an adjusting connection between the free end of said bar and said pole, hand-operative mechanism for said adjusting connection comprising pivotally connected rods connecting said adjusting mechanism with a handle, a supporting upright for said rods, and a pivotal support for the lower end of said upright.

7. In combination with a vehicle and the cross bar of its steering frame, a draft pole connected to said cross bar, a relatively short pole having pivotal support upon said cross bar at one side of said draft pole and a traveling connection between the free end of said short bar and pole.

8. In combination with a vehicle, a draft pole pivotally connected therewith to swing in vertical and horizontal planes, a relatively short pole having fixed pivotal support at one side of said draft pole to swing in vertical and horizontal planes, and a traveling connection between the free end of said short bar and pole.

9. In combination with a vehicle, a draft pole pivotally connected therewith to swing in vertical and horizontal planes, a relatively short bar having fixed pivotal support at one side of said draft pole to swing in vertical and horizontal planes, and a traveling connection between the free end of said short bar and pole comprising a screw journaled upon one and having threaded connection with a member pivotally supported upon the other.

10. In combination with a vehicle, a draft pole pivotally connected with said vehicle, a relatively short pole having fixed pivotal connection alongside said draft pole, a traveling connection between the free end of said short pole and draft pole comprising a screw journaled upon one of said poles, and threaded through a member pivotally supported upon the other pole, and hand operative mechanism for said screw supported by said vehicle.

11. A tandem draft connection for vehicles including in combination a draft pole having means whereby it may be pivotally connected with the transverse draft bar of the vehicle frame in a manner to swing laterally relative to the line of draft of the vehicle, a second pole having fixed pivotal support on said draft bar alongpivotal support on said draft bar alongside said draft pole to swing in a similar plane, and adjusting connection between said poles forward of their pivotal supports, and means controlled by the operator and operative to adjust the relative positions of said poles.

12. A tandem draft connection for harvesters including, in combination, a draft bar having means whereby it may be pivotally connected with a harvester frame and arranged transversely relative to the line of draft of the machine, a draft tongue pivotally connected with one end of said draft bar in a manner to swing laterally relative to the line of draft of the machine, a tongue brace having its rear end pivotally connected with the opposite end of said draft bar and its opposite end adjustably connected with said draft tongue in a manner to move longitudinally relative thereto, and means controlled by the operator and operative to adjust the relative positions of said tongue brace.

13. A tandem draft connection for harvesters including, in combination, a draft bar having means whereby it may be pivotally connected with a harvester frame and arranged transversely relative to the line of draft of the machine, a draft tongue pivotally connected with one end of said draft bar in a manner to swing laterally relative to the line of draft of the machine, a tongue brace having its rear end pivotally connected with the opposite end of said draft bar and its opposite end pivotally connected with a threaded sleeve, a threaded shaft journaled on said tongue, arranged parallel therewith and operatively received by said sleeve, and means connected with said shaft whereby it may be rotated in either direction in a manner to change the angle of said tongue relative to the line of draft of the machine.

In testimony whereof I affix my signature in presence of two witnesses.

PAUL HANSMANN.

Witnesses:
   WM. E. LEE,
   HERMAN STRACK.